(12) United States Patent
Bantukul

(10) Patent No.: US 7,996,007 B2
(45) Date of Patent: *Aug. 9, 2011

(54) METHODS, SYSTEMS, AND COMPUTER PROGRAM PRODUCTS FOR ROUTING A CALL FROM A 2G NETWORK TO A DUAL MODE 2G/SESSION INITIATION PROTOCOL (SIP) DEVICE

(75) Inventor: Apirux Bantukul, Cary, NC (US)

(73) Assignee: Tekelec, Morrisville, NC (US)

( * ) Notice: Subject to any disclaimer, the term of this patent is extended or adjusted under 35 U.S.C. 154(b) by 766 days.

This patent is subject to a terminal disclaimer.

(21) Appl. No.: 12/016,563

(22) Filed: Jan. 18, 2008

(65) Prior Publication Data

US 2008/0176597 A1    Jul. 24, 2008

Related U.S. Application Data

(60) Provisional application No. 60/881,084, filed on Jan. 18, 2007.

(51) Int. Cl.
*H04W 4/00* (2009.01)
(52) U.S. Cl. ............. 455/433; 455/432.1; 455/435.1; 455/456.1; 455/466
(58) Field of Classification Search .......... 455/433, 455/432.1, 435.1, 456.1, 466
See application file for complete search history.

(56) References Cited

U.S. PATENT DOCUMENTS

| 7,248,851 B2 * | 7/2007 | Lee et al. ............... 455/401 |
| 7,792,906 B2 | 9/2010 | Garcia-Martin et al. |
| 2001/0043577 A1 | 11/2001 | Barany et al. |
| 2006/0046752 A1 | 3/2006 | Kalavade |
| 2006/0068762 A1 | 3/2006 | Baldwin et al. |
| 2006/0111112 A1 | 5/2006 | Maveddat |
| 2006/0209794 A1 | 9/2006 | Bae et al. |
| 2006/0286984 A1 | 12/2006 | Bonner |
| 2007/0133574 A1 | 6/2007 | Tejani et al. |
| 2008/0176589 A1 * | 7/2008 | Bantukul ............... 455/466 |
| 2008/0176597 A1 | 7/2008 | Bantukul |

FOREIGN PATENT DOCUMENTS

WO    WO 2008/088889 A1    7/2008
WO    WO 2008/088890 A1    7/2008

OTHER PUBLICATIONS

Notification of Transmittal of the International Search Report and the Written Opinion of the International Searching Authority, or the Declaration for International Application No. PCT/US08/00712 (May 20, 2008).
Official Aciton for U.S. Appl. No. 12/016,314 (Dec. 22, 2010).
Notification of Transmittal of the International Search Report and the Written Opinion of the International Searching Authority, or the Declaration for International Application No. PCT/US2008/000710 (May 23, 2008).

* cited by examiner

*Primary Examiner* — Nghi H Ly
(74) *Attorney, Agent, or Firm* — Jenkins, Wilson, Taylor & Hunt, P.A.

(57) ABSTRACT

Methods, systems, and computer program products for routing a call from a 2G network to a dual mode 2G/session initiation protocol (SIP) device are disclosed. According to one method, a 2G mobility location information query message requesting mobility location information for delivering a call to a dual mode 2G/SIP device roaming in a SIP-based network is received at a communications signal message routing node, wherein the mobility information query message includes a destination subscriber identifier associated with the dual mode 2G/SIP device. SIP mobility location information is determined based on the destination subscriber identifier and the SIP mobility location information is provided to the query originator.

22 Claims, 4 Drawing Sheets

METHODS, SYSTEMS, AND COMPUTER PROGRAM PRODUCTS FOR ROUTING A CALL FROM A 2G NETWORK TO A DUAL MODE 2G/SESSION INITIATION PROTOCOL (SIP) DEVICE

RELATED APPLICATIONS

This application claims the benefit of U.S. Provisional Patent Application Ser. No. 60/881,084 filed Jan. 18, 2007; the disclosure of which is incorporated herein by reference in its entirety.

TECHNICAL FIELD

The subject matter described herein relates to routing a call in communications networks. More specifically, the subject matter relates to methods, systems, and computer program products for routing a call from a 2G network to a dual mode 2G/session initiation protocol (SIP) device.

BACKGROUND

Modern communications networks may be composed of a variety of different networking technologies, and therefore, modern mobile handsets are often capable of operating in more than one type of network. For example, a subscriber may roam between a 2G network and a session initiation protocol (SIP)-based network while using a mobile dual mode handset device. Exemplary 2G networks include global system for mobile communications (GSM), code division multiple access (CDMA) networks, and time division multiple access (TDMA) networks. Similarly, exemplary SIP-based networks include WiFi, worldwide interoperability for microwave access (WiMAX), Internet multimedia subsystem (IMS), and next generation network (NGN) networks. Because these different networks may use various signaling messages and network nodes to establish calls between subscribers, the steps for determining the availability and location of a destination subscriber may differ depending on the type of network to which the subscriber is connected.

For example, when a mobile subscriber initially connects to a 2G network, the subscriber's mobile handset registers with a home location register (HLR) storing location information for the subscriber's handset. The stored location information may include network identification information associated with a mobile switching center (MSC) currently serving the subscriber, such as a network node number (NNN) identifier. Therefore, when the subscriber receives a call originating from another 2G network subscriber, the originating MSC for that call attempts to locate the MSC currently serving the destination subscriber's handset. This determination may include querying the HLR associated with the destination subscriber in order to determine whether the destination mobile subscriber device is available to receive the call as well as its current location.

However, problems arise when the destination subscriber is roaming in a SIP-based network because a conventional HLR located in a 2G network does not contain routing information for SIP-based network nodes. Therefore, one conventional solution for providing interoperability/roaming of mobile subscribers between 2G and SIP-based networks is to store additional information in the HLR indicating the SIP-based network node serving a roaming destination subscriber.

One problem associated with this conventional method for processing calls traversing between 2G and SIP-based networks is that the HLRs may be overly burdened by having to respond to the large number of routing information request queries requesting mobility location information for delivering such calls. Specifically, as the number of subscribers and routing information request queries associated with these calls increases, so too does the amount of processing resources that must be used to process them. Moreover, modification of the widely deployed system of HLRs in existing 2G networks may be cumbersome and expensive. Therefore, it is desirable to networks operators to have a mobility management solution which includes an inexpensive and feasible modification to existing HLRs and operates transparently to mobile subscribers.

Accordingly, a need exists for improved methods and systems for routing a call from a 2G network to a SIP-based network.

SUMMARY

Methods, systems, and computer program products for routing a call from a 2G network to a dual mode 2G/session initiation protocol (SIP) device are disclosed. According to one method, a 2G mobility location information query message requesting mobility location information for delivering a call to a dual mode 2G/SIP device roaming in a SIP-based network is received at a communications signal message routing node, wherein the mobility information query message includes a destination subscriber identifier associated with the dual mode 2G/SIP device. SIP mobility location information is determined based on the destination subscriber identifier and the SIP mobility location information is provided to the query originator.

A system for routing a call from a 2G network to a dual mode 2G/SIP device is also disclosed. The system comprises a mobility location database for storing at least one destination subscriber identifier and at least one associated SIP mobility location information. A mobility location function is configured to receive a SIP mobility location information query message requesting mobility location information for delivering a call to a dual mode 2G/SIP device roaming in a SIP-based network, wherein the mobility location information query message includes the destination subscriber identifier associated with a dual mode 2G/SIP device, and to determine the SIP mobility location information based on the destination subscriber identifier by querying the mobility location database using the subscriber identifier.

The subject matter described herein for routing a call from a 2G network to a dual mode 2G/SIP device may be implemented using a computer program product comprising computer executable instructions embodied in a tangible computer readable medium that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for routing a call described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
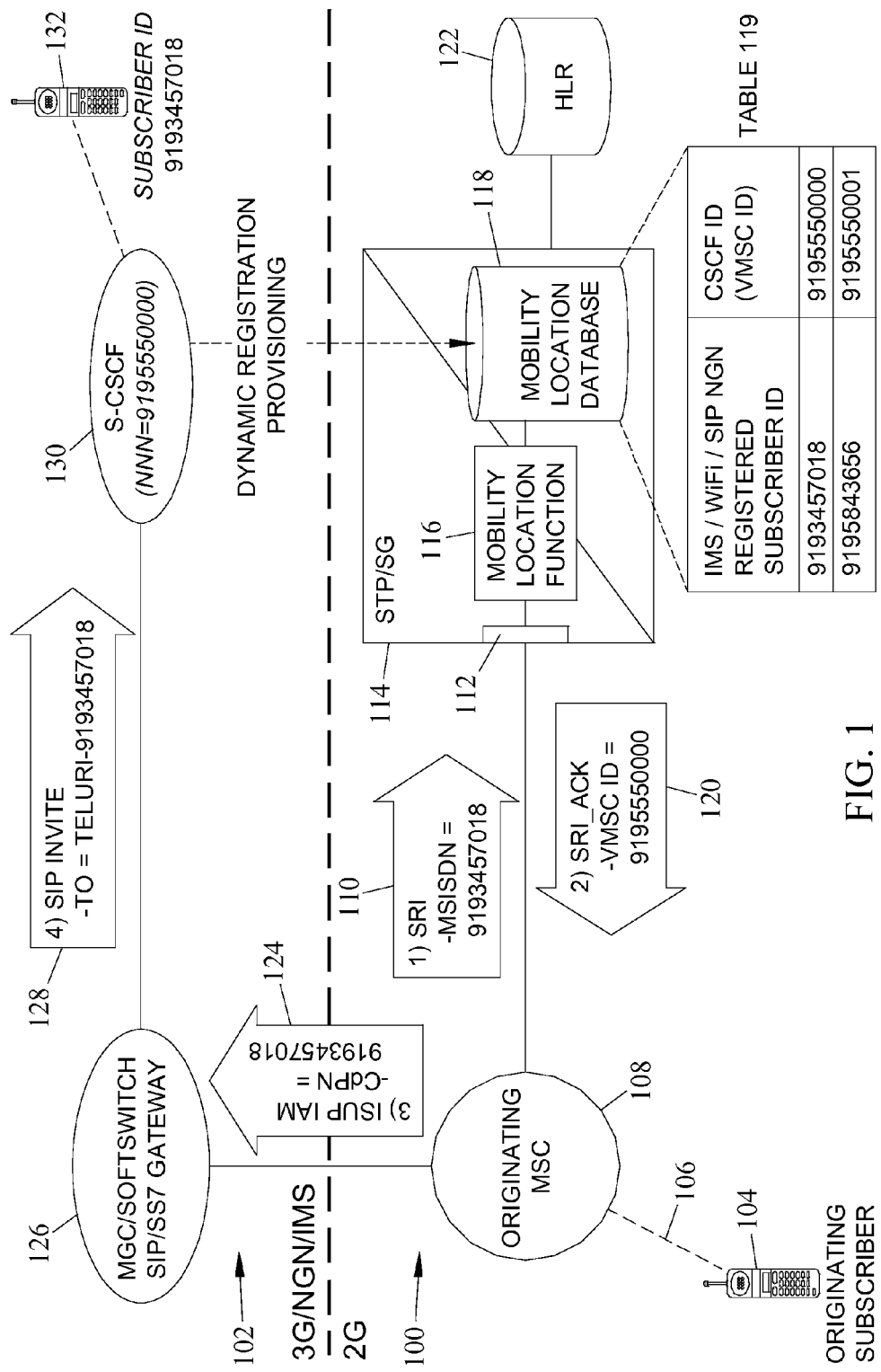
FIG. 1 is a network diagram of an exemplary system for routing a call from a 2G network to a dual mode 2G/SIP device operating in the SIP network according to an embodiment of the subject matter described herein.

FIG. 1 is a network diagram of an exemplary system for routing a call from a 2G network to a SIP-based network. FIG. 1 illustrates both 2G network 100 and SIP-based network 102, where a call originating in 2G network 100 may be terminated in SIP-based network 102. For example, originating mobile device 104 may be used to initiate a call 106 with an originating mobile switching center (MSC) 108, which serves as the query originator. It is appreciated that 2G network 100 may include one of a GSM, CDMA, TDMA, or other 2G network 100 without departing from the scope of the subject matter described herein. Similarly, SIP-based network 102 may be any SIP-based network including, but not limited to, an IMS, WiFi, WiMAX, or NGN network. In FIG. 1, a plurality of exemplary network elements are shown for the purpose of illustrating one embodiment of the subject matter described herein. Therefore, it is further appreciated that other networking elements or configurations, as well as multiple instances of the network elements shown in FIG. 1 may be also used.

Upon receiving a call 106, O-MSC 108 may attempt to determine routing information for the call. For example, O-MSC 108 may generate and send a mobility information query message 110, which includes a destination subscriber identifier, to home location register (HLR) 122. In FIG. 1, mobility information query message 110 is embodied as a SendRoutingInformation (SRI) message that includes a mobile service identification subscriber directory number (MSISDN) (i.e., 9193457018) associated with destination mobile subscriber device 132. In an alternate implementation, such as an IS-41 implementation, query message 110 may be a location request (Loc_Req) message.

In one embodiment, mobility information query message 110 may be communicated to HLR 122 via one or more signaling points 114. For example, mobility information query message 110 may be received at communications port 112 of signal transfer point (STP)/signaling gateway (SG) 114 which is located between O-MSC 108 and HLR 122. In one embodiment, STP/SG 114 includes a mobility location function 116 and a mobility location database 118. As will be described in more detail below, mobility location function 116 may be responsible for inspecting incoming mobility information query messages 110 and referencing mobility location database 118 to determine if the destination mobile subscriber device is located in a SIP-based network (e.g., network 102). Mobility location function 116 may be embodied as a hardware component, a software-based program or module, or a combination of both. According to one embodiment, mobility location function 116 and mobility location database 118 may be integrated or co-located with STP/SG 114. In an alternate embodiment, mobility location function 116 and/or mobility location database 118 may be embodied as separate elements that are independent from, yet still accessible by, STP/SG 114. For instance, mobility location database 118 may be located on an independent hardware platform and/or server capable of communicating with STP/SG 114 via, for example, an Ethernet connection.

Returning to the exemplary scenario described above for determining mobility location information, mobility location function 116 may receive or intercept mobility information query message 110 via communications port 112. In one embodiment, mobility location function 116 may be communicatively coupled to mobility location database 118, which may store one or more subscriber identifiers associated with one or more network node number (NNN) identifiers, such as call session control function (CSCF) identifiers. However, it is appreciated that the information contained in mobility location database 118 may include other types of data without departing from the scope of the subject matter described herein. This information may include an E.164-formatted number, an SS7 point code address, a uniform resource identifier (URI), an Internet protocol (IP) address, or the like.

As mentioned above, mobility location database 118 contains information that indicates whether a destination mobile subscriber device is located in a SIP-based network. In one embodiment, mobility location database 118 includes on or more tables, such as table 119 shown in FIG. 1, for storing the location information. Notably, table 119 illustrates exemplary information that may be stored in mobility location database 118. Referring to Table 119, subscriber identifier 9193457018 is located in a first column entry being associated with CSCF identifier 9195550000, which is located in a corresponding second column entry. Therefore, a lookup by mobility location function 116 in mobility location database 118 for MSISDN 9193457018, which is acquired from mobility information query message 110, would result in locating the appropriate CSCF identifier (e.g., NNN identifier 9195550000). Based on this determination, mobility location function 116 may insert the determined CSCF identifier 9195550000 in a mobility information query message acknowledgment message, such as mobility information response message 120 (e.g., an SRI_Acknowledgement message). Additionally, mobility information response message 120, which includes the SIP-based network information (e.g., the NNN identifier) determined by mobility location function 116, may be returned to O-MSC 108 (i.e., the query originator) in order to facilitate rerouting of the call to SIP-based network 102. In this case, mobility information response message 120 may be transmitted to O-MSC 108, which in response, may generate a forwarding message, such as ISUP IAM message 124. ISUP IAM message 124 may include both the destination subscriber identifier (e.g., CdPN 9193457018) destination mobile subscriber device 132 and a network identifier (e.g., NNN 9195550000) associated with SIP-based network element 130 serving that device 132.

ISUP IAM message 124 may then be sent to network element 126, such as a circuit switched-to-packet switched gateway node, a media gateway controller (MGC), a softswitch, a session initiation protocol (SIP)—SS7 gateway. Network element 126 may then generate a SIP INVITE message, based on the ISUP IAM message, which includes the destination subscriber identifier in the "To" field and send it the destination mobile subscriber device 132. In this way, a 2G originated message may be rerouted to a SIP-based destination for a subscriber roaming in a SIP-based network without burdening 2G HLR resources.

Figure 2:
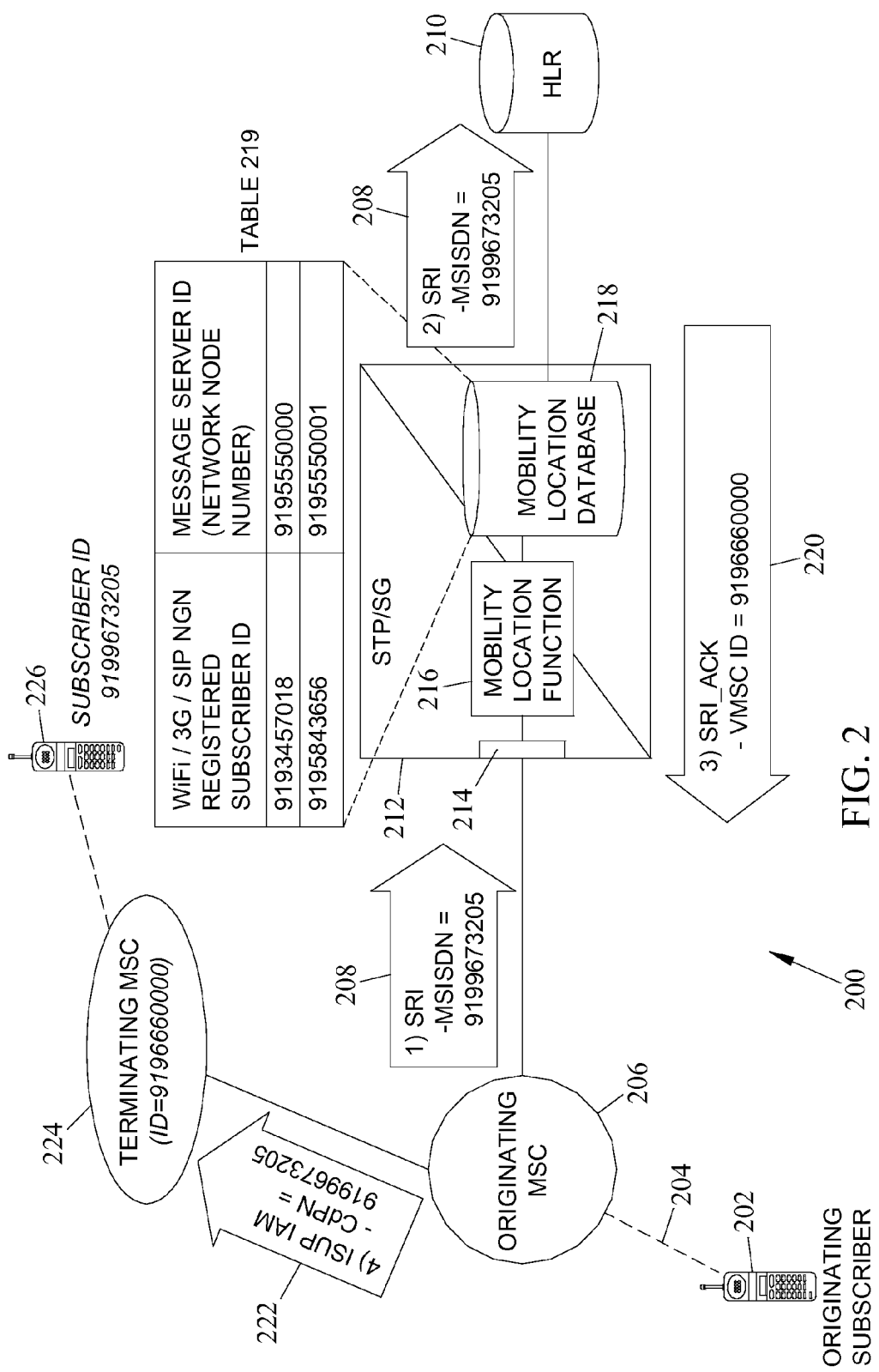
FIG. 2 is a network diagram of an exemplary system for routing a call from a 2G network to a dual mode 2G/SIP device operating in the 2G network according to an embodiment of the subject matter described herein.

FIG. 2 is a network diagram of an exemplary system for routing a call within a 2G network. Specifically, FIG. 2 illustrates an exemplary sequence of messages when the destination subscriber is not roaming in a SIP-based network and therefore no SIP mobility location information is required. The illustrated scenario begins when originating subscriber device 104 initiating a message 106, which is received by O-MSC 108. Similar to the steps described above with respect to FIG. 1, O-MSC 108 may generate and send a mobility information query message including a destination subscriber identifier to an appropriate HLR. For example, O-MSC 108 may send mobility information query message 110 including MSISDN 919673205 to HLR 122 via STP/SG 114.

In one embodiment, mobility location database 118 may be provisioned with the NNN identifiers of CSCFs that are supporting subscribing mobile devices that roam into or within SIP-based networks. Returning to FIG. 1, mobility location database 118 may be provisioned by receiving registration event messages from S-CSCF 130. In an exemplary scenario for provisioning and continually updating mobility location database 118, destination mobile subscriber device 132 may be a dual mode handset capable of operating in both 2G network 100 and SIP-based network 102. In this case, 2G network 100 may include a GSM, CDMA, or TDMA network and SIP-based network may include a WiFi, WiMAX network, 3G, or any other NGN network.

In order for mobility location database 118 to receive registration event notification information associated with destination mobile subscriber device 132, STP/SG 114 may submit a subscription request (hereinafter, simply "subscribe") to S-CSCF 130. In an alternate embodiment, STP/SG 114 may submit a subscription request to an IMS home subscriber server (HSS) node (not shown). This subscription request may identify STP/SG 114 as well as a block of one or more subscriber identifiers for which STP/SG 114 requests notification of all location registration messages generated by S-CSCF 130 relating to those subscribers. Therefore, once S-CSCF 130 is made aware of a subscriber roaming in SIP-based network 102, a notification message maybe sent to STP/SG 114 located in 2G network 100. In this way, dynamic registration provisioning of mobility location database 118 across the network boundary dividing 2G network 100 and SIP-based network 102 is performed according to an embodiment of the subject matter described herein.

Accordingly, when mobile subscriber handset 132 is roaming in (or activated within) SIP-based network 102, subscriber handset 132 registers with S-CSCF 130 indicating that subscriber 132 is now served by S-CSCF 130. As described above, this registration message may then be sent to STP/SG 114 located in 2G network 100. STP/SG 114 may then forward the registration message to mobility location function 116 for updating mobility location database 118. Referring to table 119, the registration message may indicate that subscriber identifier 9193457018 is associated with CSCF identifier 9195550000 and, as shown in the first entry of table 119, mobility location database 118 may be populated with this information so that future queries for routing information associated with subscriber identifier 9193457018 may provide for routing messages to S-CSCF 130.

Figure 3:
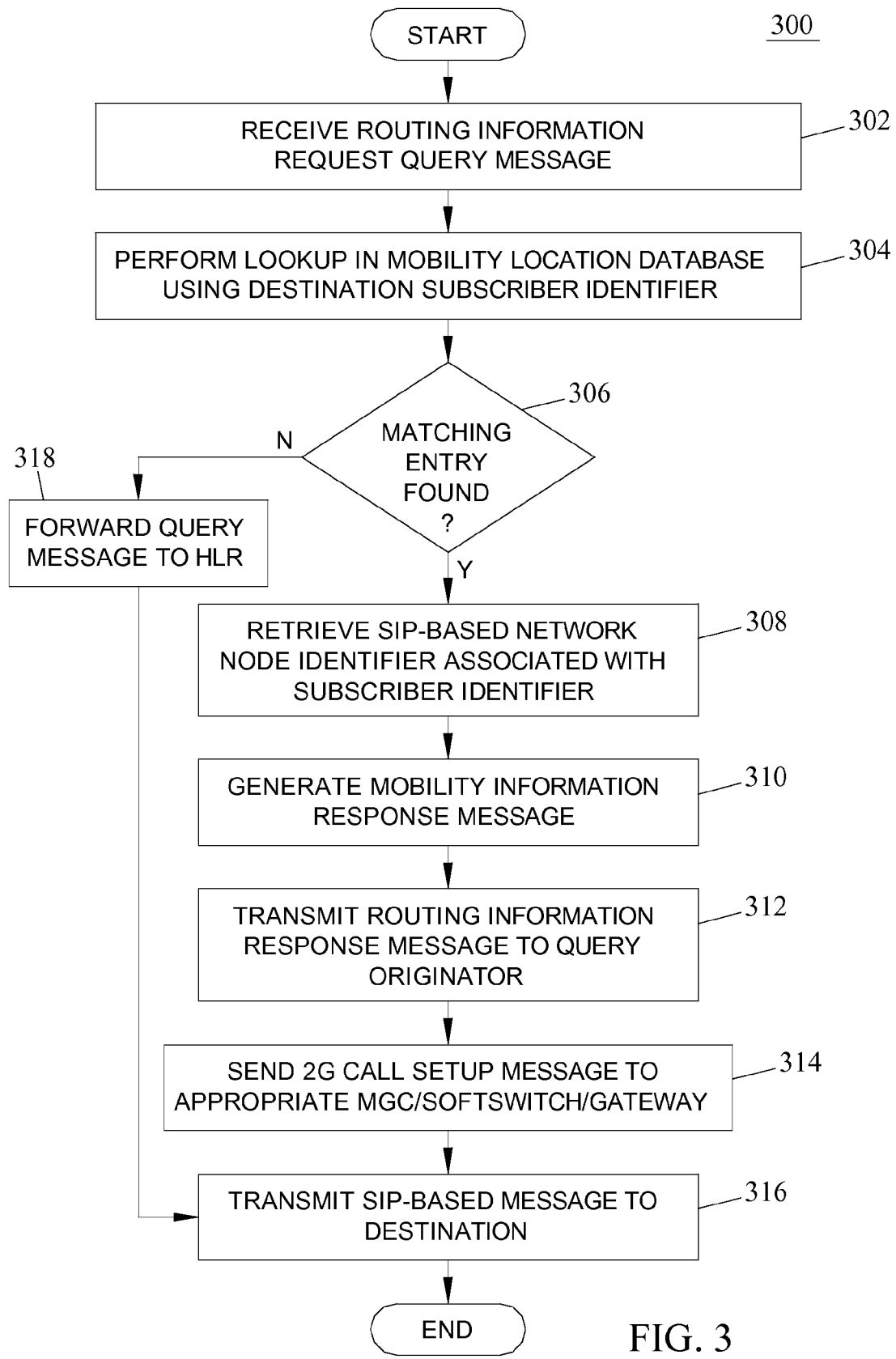
FIG. 3 is a flow chart illustrating exemplary steps for routing a call from a 2G network to a dual mode 2G/SIP device according to an embodiment of the subject matter described herein.

FIG. 3 is a flow chart illustrating exemplary steps of a method 300 for routing a call from a 2G network to a SIP-based network. In block 302, a mobility information query message is received. In one embodiment, STP/SG 114 receives an SRI message 110 from O-MSC 108, which is servicing an originating subscriber device 104 (e.g., as a query originator). Notably, SRI message 110 may include a destination subscriber identifier, such as the phone number of the called party (e.g., MSISDN=9193457018, as depicted in FIG. 1).

In block 304, a lookup in a mobility location database using the destination subscriber identifier is performed. In one embodiment, mobility location function 116 queries mobility location database 118 and cross-references the destination subscriber identifier with the entries in table 119.

In block 306, a determination is made as to whether a matching entry in Table 119 is found. If the destination subscriber identifier matches an entry in Table 119 of mobility location database 118, then method 300 continues to block 308. Otherwise, method 300 proceeds to block 320 where the mobility location function 116 forwards the SRI message to HLR 122 (i.e., the original destination) in accordance to normal operation.

In block 308, a SIP-based network node identifier associated with the destination subscriber identifier is acquired. In one embodiment, mobility location function 116 retrieves the CSCF identifier in table 119 that corresponds to the registered subscriber identifier that matches the destination subscriber identifier cross-referenced in block 304.

In block 310, a mobility information response message is generated. In one embodiment, mobility information function 114 generates mobility information response message 120. In one embodiment, mobility information response message 120 comprises a SRI_Acknowledgement message that includes the CSCF identifier obtained in block 308 (e.g., a network node number (NNN) identifier). In an alternate embodiment, response message may be a location request return request message.

In block 312, the mobility information response message is transmitted to the query originator. In one embodiment, mobility information function 114 transmits SRI_Acknowledgement message 120, which contains the aforementioned SIP-based network node identifier corresponding to the NGN network servicing the destination subscriber device 132, to O-MSC 108.

In block 314, the query originator sends a forwarding message to the appropriate CSCF. In one embodiment, O-MSC 108 receives SRI_Acknowledgement message 120 and transmits a ISUP IAM message 124 to MGC/Softswitch 126.

In block 316, the recipient CSCF transmits the SIP-based message to the destination mobile subscriber device. In one embodiment, MGC/softswitch/gateway 126 translates the ISUP IAM message into an associated SIP INVITE message and transmits the SIP INVITE message 128 to S-CSCF 130 for delivery to the intended destination mobile subscriber device 132.

Figure 4:
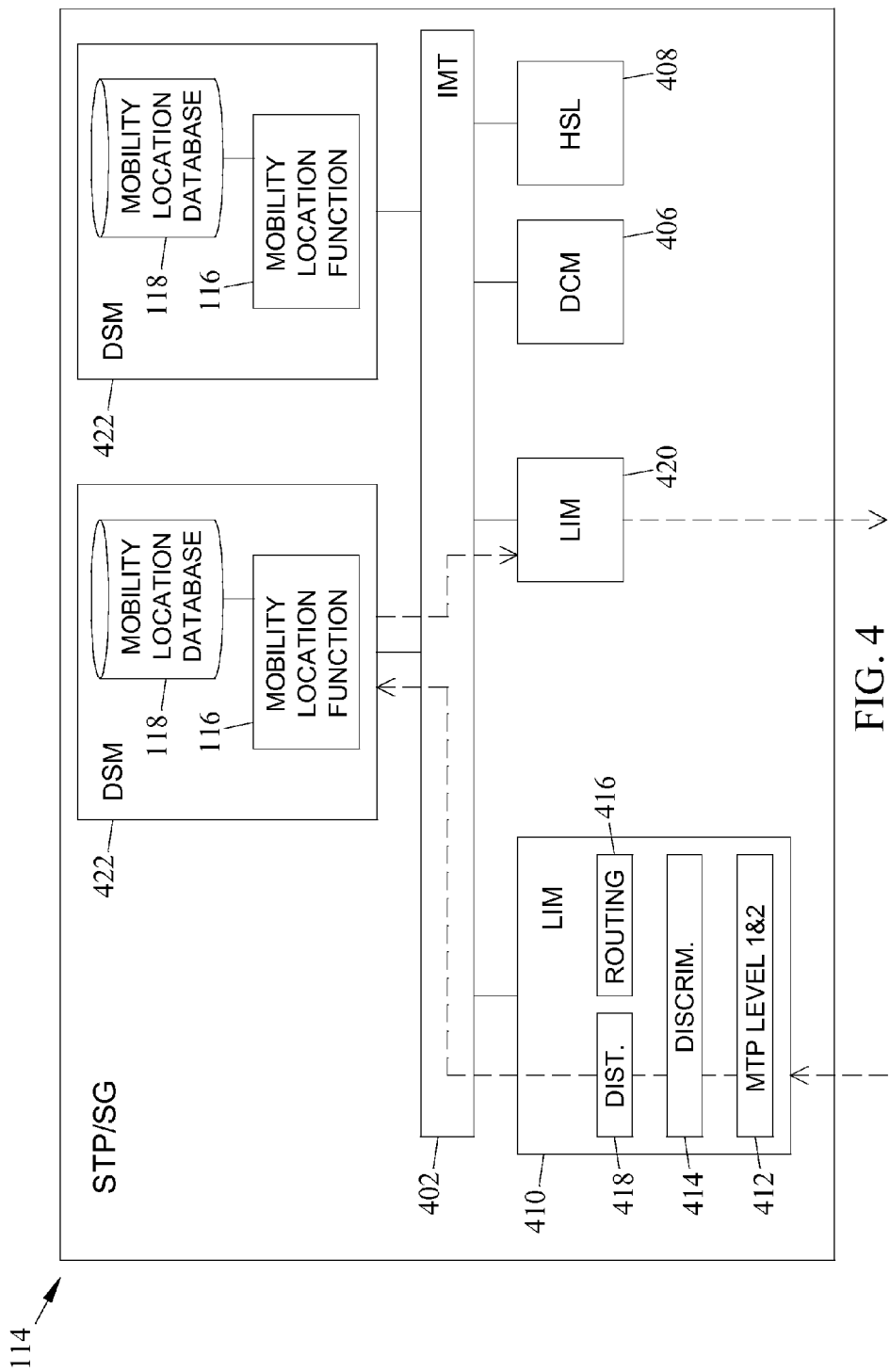
FIG. 4 is a block diagram of a signal transfer point containing an integrated mobility location function and mobility location database for routing a call from a 2G network to a dual mode 2G/SIP device according to an embodiment of the subject matter described herein.

FIG. 4 is a block diagram of an exemplary internal architecture of a signaling message routing node, such as STP/SG 114, with an integrated mobility location module 116 and an integrated mobility location database 118 according to an embodiment of the subject matter described herein. Referring to FIG. 4, STP/SG 114 may include an internal communications bus 402 that includes two counter-rotating serial rings. In one embodiment, a plurality of processing modules or cards may be coupled to bus 402. In FIG. 4, bus 402 may be coupled to one or more communications modules, such as a link interface module (LIM) 410, a data communications module (DCM) 406, a database service module (DSM) 422, and a high speed link (HSL) 408. Each of these modules is physically connected to bus 402 such that signaling and other types of messages may be routed internally between active cards or modules. LIM 410 includes functionality for sending and receiving SS7 messages via an SS7 network. DCM 406 includes functionality for sending and receiving SS7 messages over IP signaling links. Similarly, HSL 408 includes functionality for sending and receiving messages over a high speed link.

When a signaling message, such as an SRI query, is received by STP/SG 114, the message may be processed by LIM 410, DCM 406, or HSL 408 depending on whether the message is sent over an SS7 link, an IP signaling link, or a high speed link. The message is passed up the communications protocol stack (e.g., MTP level 1&2 processing module 412, discrimination module 414, etc.) on the receiving communication module until it reaches the module's respective message distribution function 418, which forwards the message to DSM 422. In one embodiment, at least one DSM module 422 in STP/SG 114 is equipped with a mobility location module 116 and mobility location database 118. That is, in one implementation, messages received by LIM 410 or 420, and DCM 406, or HSL 408 may be processed at the mobility function module 116 and identified as candidates for mobility location processing. For example, mobility location function 116 queries mobility location database 118 in the manner described above to determine if the destination mobile subscriber device is positioned in a SIP-based network.

One advantage of the provisioning mobility location database 118 located on STP 114 rather than HLR 122 as described above is that no modifications need to be made to HLR 122. Because typical networks include a large number of HLRs, which may be expensive to modify, using the system described above which interoperates with existing HLRs saves network operators the expense associated with modifying many HLRs. Additionally, the processing capacity of existing HLRs are finite and in high demand in current networks as more and more queries are directed to them and additional network subscribers are added. Therefore, instead of purchasing additional HLRs in order to increase processing resources, network operators may shield existing HLRs from processing queries for subscribers roaming in SIP-based networks, thereby reducing the processing load on existing HLRs.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing a call from a 2G network to a dual mode 2G/SIP device, the method comprising:
at a communications signaling message routing node:
receiving a 2G mobility location information query message requesting mobility location information for delivering a call to a dual mode 2G/SIP device roaming in a SIP-based network, wherein the mobility location information query message includes a destination subscriber identifier associated with the dual mode 2G/SIP device;
determining SIP mobility location information for the dual mode 2G/SIP device based on the destination subscriber identifier; and
providing the SIP mobility location information to a query originator.

2. The method of claim 1 wherein receiving a 2G mobility information query message includes intercepting one of a location request and a (SRI) Send Routing Information message directed to a home location register (HLR).

3. The method of claim 1 comprising, prior to receiving the 2G mobility information query message, receiving at least one of a next generation network NGN registration notification message and an Internet multimedia subsystem (IMS) registration notification message concerning the destination subscriber identifier and wherein determining the SIP mobility location information includes extracting the SIP mobility location information from the at least one of a NGN registration notification message and IMS notification message.

4. The method of claim 1 wherein determining a SIP-based network node identifier includes determining at least one of a call session control function (CSCF) identifier, a gateway identifier, an E.164-formatted identifier, a signaling system 7 (SS7) point code address, a uniform resource identifier (URI), and an Internet protocol (IP) address.

5. The method of claim 1 wherein determining the SIP-based mobility location information includes performing a lookup in a mobility location database containing at least one of each of a destination subscriber identifier and a corresponding at least one SIP-based network node identifier.

6. The method of claim 1 wherein providing the SIP mobility location information comprises generating a mobility routing information response message that includes the SIP mobility location information.

7. The method of claim 6 wherein the SIP mobility location information includes one of a serving call session control function (CSCF) identifier and a network node number (NNN) identifier.

8. The method of claim 1 wherein providing the SIP mobility location information includes transmitting a mobility routing information response message to the query originator.

9. The method of claim 1 comprising, forwarding the query message to a home location register (HLR) in response to failing to determine the SIP mobility location information.

10. A method for provisioning a mobility location database, the method comprising:
subscribing to a SIP network node for receiving SIP mobility location information associated with a dual mode 2G/SIP device roaming in a SIP-based network;
receiving a registration event message including SIP mobility location information associated with the SIP network node and a destination subscriber identifier associated with the dual mode 2G/SIP device; and
populating, with the SIP mobility location information and the destination subscriber identifier, a mobility location database for routing calls to the dual mode 2G/SIP device.

11. A system for routing a call from a 2G network to a dual mode 2G/SIP device, the system comprising:
a mobility location database for associating at least one destination subscriber identifier with SIP mobility location information for a dual mode 2G/SIP device roaming in a SIP-based network; and
a mobility location function for receiving a 2G mobility location information query message requesting mobility location information for delivering a call to a dual mode 2G/SIP device roaming in a SIP-based network, wherein the mobility location information query message includes the destination subscriber identifier associated with the dual mode 2G/SIP device, and determining the SIP mobility location information based on the destination subscriber identifier by querying the mobility location database using the subscriber identifier.

12. The system of claim 11 wherein the mobility location function is located on at least one of a signal transfer point (STP) and a signaling gateway (SG).

13. The system of claim 11 wherein receiving a 2G mobility information query message includes intercepting a (SRI) Send Routing Information message directed to a home location register (HLR).

14. The system of claim 11 comprising, prior to receiving the 2G mobility information query message, receiving at least one of a next generation network (NGN) registration notification message and an Internet multimedia subsystem (IMS) registration notification message.

15. The system of claim 11 wherein the mobility location function is configured to determining at least one of a call session control function (CSCF) identifier, a gateway identifier, an E.164-formatted identifier, a signaling system 8 (SS7) point code address, a uniform resource identifier (URI), and an Internet protocol (IP) address.

16. The system of claim 11 wherein an at least one of each of a 2G destination subscriber identifier and a corresponding at least one SIP-based network node identifier.

17. The system of claim 11 wherein the mobility location function is configured to generate a mobility routing information response message that includes a SIP-based network node identifier.

18. The system of claim 17 wherein the SIP-based network node identifier includes one of a serving call session control function (CSCF) identifier and a network node number (NNN) identifier.

19. The system of claim 17 wherein the mobility location function is configured to transmit the mobility routing information response message to the query originator.

20. The system of claim 11 wherein the mobility location function is configured to forward the query message to a home location register (HLR) in response to failing to determine the SIP mobility location information.

21. A system for provisioning a mobility location database, the system comprising:
  a mobility location database for storing at least one destination subscriber identifier and at least one associated SIP mobility location information; and
  a mobility location function for subscribing to a SIP network node for SIP mobility location information associated with a dual mode 2G/SIP device roaming in a SIP-based network, and for receiving a registration event message including at least a SIP mobility location information associated with the SIP network node and a destination subscriber identifier associated with the dual mode 2G/SIP device, and for populating the mobility location database with at least the SIP mobility location information and the destination subscriber identifier.

22. A computer program product comprising computer executable instructions embodied in a tangible computer readable medium and when executed by a processor of a computer performs steps comprising:
  at a communications signaling message routing node:
    receiving a 2G mobility location information query message requesting mobility location information for delivering a call to a dual mode 2G/SIP device, wherein the mobility information query message includes a destination subscriber identifier associated with a dual mode 2G/SIP device;
    determining SIP mobility location information based on the destination subscriber identifier; and
    providing the SIP mobility location information to the query originator.

* * * * *